(12) United States Patent
Takenaka et al.

(10) Patent No.: US 11,296,374 B2
(45) Date of Patent: Apr. 5, 2022

(54) METAL-AIR BATTERY

(71) Applicant: SHARP KABUSHIKI KAISHA, Osaka (JP)

(72) Inventors: Shinobu Takenaka, Osaka (JP); Hirotaka Mizuhata, Osaka (JP); Shunsuke Sata, Osaka (JP); Tomo Kitagawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 272 days.

(21) Appl. No.: 16/479,362

(22) PCT Filed: Jan. 31, 2018

(86) PCT No.: PCT/JP2018/003250
§ 371 (c)(1),
(2) Date: Jul. 19, 2019

(87) PCT Pub. No.: WO2018/143287
PCT Pub. Date: Aug. 9, 2018

(65) Prior Publication Data
US 2019/0356031 A1  Nov. 21, 2019

(30) Foreign Application Priority Data
Feb. 3, 2017  (JP) .............................. JP2017-018338

(51) Int. Cl.
*H01M 12/08* (2006.01)
*H01M 12/06* (2006.01)
(Continued)

(52) U.S. Cl.
CPC ............ *H01M 12/08* (2013.01); *H01M 12/06* (2013.01); *H01M 50/409* (2021.01); *H01M 50/60* (2021.01); *H01M 2300/0014* (2013.01)

(58) Field of Classification Search
CPC ...... H01M 12/08; H01M 12/06; H01M 50/60; H01M 50/409; H01M 2300/0014
See application file for complete search history.

(56) References Cited

U.S. PATENT DOCUMENTS

2011/0027665 A1* 2/2011 Burchardt ........... H01M 4/8663
429/405
2013/0224632 A1 8/2013 Roumi
(Continued)

FOREIGN PATENT DOCUMENTS

JP  S46-015251 A  4/1971
JP  2001-266961 A  9/2001
(Continued)

OTHER PUBLICATIONS

EPO machine generated English translation of JP 2001-266961A (Year: 2001).*
Written Opinion dated Apr. 17, 2018 for PCT/JP2018/003250.

*Primary Examiner* — Christopher P Domone
*Assistant Examiner* — Kimberly Wyluda
(74) *Attorney, Agent, or Firm* — ScienBiziP, P.C.

(57) ABSTRACT

A metal-air battery includes a metal negative electrode (12), an oxygen-generating electrode placed on a surface of the metal negative electrode, and an air electrode placed on another surface of the metal negative electrode. The metal negative electrode includes at least a negative electrode active material layer facing the oxygen-generating electrode. A first separator placed in contact with the negative electrode active material layer is placed between the negative electrode active material layer and the oxygen-generating electrode.

9 Claims, 5 Drawing Sheets

(51) Int. Cl.
*H01M 50/409* (2021.01)
*H01M 50/60* (2021.01)

(56) References Cited

U.S. PATENT DOCUMENTS

2015/0340732 A1* 11/2015 Kim .................... H01M 50/463
429/94
2015/0364789 A1   12/2015 Ogawa et al.

FOREIGN PATENT DOCUMENTS

| JP | 2014-127289 A | 7/2014 |
| JP | 2015-005493 A | 1/2015 |
| JP | 2015-519686 A | 7/2015 |
| WO | 2014-103943 A1 | 7/2014 |

* cited by examiner

METAL-AIR BATTERY

TECHNICAL FIELD

The present disclosure relates to a metal-air battery in which metal such as zinc is used as a negative electrode active material and in which oxygen in air is used as a positive electrode active material.

BACKGROUND ART

Metal-air batteries are configured to include an air electrode (positive electrode), a metal negative electrode (negative electrode), and an electrolyte layer (electrolytic solution) (see, for example, Patent Literature 1). Patent Literature 1 discloses a three-electrode zinc-air battery including a metal negative electrode containing metal (zinc) serving as an electrode active material, an oxygen-generating electrode used as a positive electrode during charge, and an oxygen-reducing electrode (air electrode) used as a positive electrode during discharge.

In the zinc-air battery disclosed in Patent Literature 1, the oxygen-reducing electrode is placed on a surface of the metal negative electrode with a first separator therebetween and the oxygen-generating electrode is placed on another surface of the metal negative electrode with a second separator therebetween. In Patent Literature 1, the second separator is in direct contact with the oxygen-generating electrode and is not in direct contact with the metal negative electrode.

CITATION LIST

Patent Literature

PTL 1: Japanese Unexamined Patent Application Publication No. 2014-127289

SUMMARY OF INVENTION

Technical Problem

In the zinc-air battery disclosed in Patent Literature 1, the second separator is in direct contact with the oxygen-generating electrode and is not in direct contact with the metal negative electrode. In such a configuration, an electrolytic solution is interposed between the metal negative electrode and the second separator and a negative electrode active material is dissolved in the electrolytic solution from the metal negative electrode or falls therefrom. Therefore, repeating charge and discharge allows the negative electrode active material to be unevenly deposited in the electrolytic solution or on a surface of the metal negative electrode; hence, cycle characteristics of the battery deteriorates.

The present disclosure has been made in view of the above problem and has an object to prevent the deterioration in cycle characteristics of a metal-air battery due to the uneven deposition of a negative electrode active material.

Solution to Problem

In order to solve the above problem, a metal-air battery according to an embodiment of the present disclosure includes a metal negative electrode, an oxygen-generating electrode placed on a surface of the metal negative electrode, and an air electrode placed on another surface of the metal negative electrode. The metal negative electrode includes at least a negative electrode active material layer facing the oxygen-generating electrode. The metal-air battery includes a first separator which is placed between the negative electrode active material layer and the oxygen-generating electrode and which is in direct contact with the negative electrode active material layer.

According to the above configuration, since the first separator is interposed between the metal negative electrode and the oxygen-generating electrode and is in direct contact with the metal negative electrode, the fall of a negative electrode active material into an electrolytic solution can be suppressed and the negative electrode active material can remain in the first separator. This enables the uneven deposition of the negative electrode active material on a surface of the negative electrode active material layer. As a result, the deterioration in cycle characteristics of the battery can be prevented.

The metal-air battery may have a configuration in which the metal negative electrode further includes a negative electrode current collector, the negative electrode active material layer includes a first negative electrode active material portion placed closer to the oxygen-generating electrode than to the negative electrode current collector and a second negative electrode active material portion placed closer to the air electrode than the negative electrode current collector, and the thickness of the first negative electrode active material portion is larger than the thickness of the second negative electrode active material portion.

In general, in metal-air batteries, there is a problem in that the reduction of metal (zinc or the like) in the surface of a negative electrode active material facing the oxygen-generating electrode during charge grows dendrites (needle-like metal deposits) to cause a short circuit between a negative electrode and an oxygen-generating electrode. According to the above configuration, the thickness of the first negative electrode active material portion is larger than the thickness of the second negative electrode active material portion; hence, the distance from the negative electrode current collector to a surface of the first negative electrode active material portion (a surface of the metal negative electrode facing the oxygen-generating electrode) can be increased. This enables the growth of dendrites on the first negative electrode active material portion surface to be suppressed, thereby enabling charge at a deeper depth as compared to conventional metal-air batteries.

The metal-air battery may have a configuration in which the metal negative electrode further includes a negative electrode current collector, the negative electrode active material layer includes a first negative electrode active material portion placed closer to the oxygen-generating electrode than the negative electrode current collector and a second negative electrode active material portion placed closer to the air electrode than to the negative electrode current collector, and the average porosity of the second negative electrode active material portion is larger than the average porosity of the first negative electrode active material portion or the average density of the second negative electrode active material portion is larger than the average density of the first negative electrode active material portion.

According to the above configuration, the average porosity of the second negative electrode active material portion is larger than the average porosity of the first negative electrode active material portion; hence, the ion conduction resistance between the air electrode and the negative electrode current collector can be reduced. This enables the discharge voltage to be increased and the deactivation of the second negative electrode active material portion to be prevented.

The metal-air battery may have a configuration in which the metal-air battery includes a second separator which is placed between the metal negative electrode and the air electrode and which is placed in direct contact with a surface of the metal negative electrode that is facing the air electrode, the first separator is an anion-exchange membrane, and the second separator is a porous membrane made of resin.

The metal-air battery may have a configuration in which the metal negative electrode is placed on both sides of the oxygen-generating electrode and the air electrode is placed outside the metal negative electrode.

According to the above configuration, the metal negative electrode is placed on both sides of the oxygen-generating electrode and the air electrode is placed outside the metal negative electrode. This configuration is a configuration in which a single oxygen-generating electrode can be used with two metal negative electrodes, that is, a configuration having two pairs of charge sections composed of the oxygen-generating electrode and the metal negative electrodes; hence, high energy density can be achieved.

The metal-air battery may have a configuration in which the ratio of the thickness of the first negative electrode active material portion to the thickness of the second negative electrode active material portion is 3:1 to 120:1.

The metal-air battery may have a configuration in which the metal negative electrode further includes a negative electrode current collector, the negative electrode active material layer includes a first negative electrode active material portion placed closer to the oxygen-generating electrode than the negative electrode current collector and a second negative electrode active material portion placed closer to the air electrode than the negative electrode current collector, the average porosity of the first negative electrode active material portion is within the range of 5% to 55%, and the average porosity of the second negative electrode active material portion is within the range of 65% to 95%.

The metal-air battery may have a configuration in which the metal negative electrode further includes a negative electrode current collector, the negative electrode current collector is placed between the negative electrode active material layer and the air electrode so as to be in direct contact with the negative electrode active material layer, and the metal-air battery further includes a second separator which is placed between the metal negative electrode and the air electrode and which is placed in direct contact with the negative electrode current collector of the metal negative electrode.

The metal-air battery may have a configuration in which the metal negative electrode further includes a negative electrode current collector, the negative electrode active material layer includes, a first negative electrode active material portion placed on closer to the oxygen-generating electrode than the negative electrode current collector and a second negative electrode active material portion placed closer to the air electrode than the negative electrode current collector, and the metal-air battery further includes a second separator which is placed between the metal negative electrode and the air electrode and which is placed in direct contact with the second negative electrode active material portion.

The metal-air battery may have a configuration in which a first insulator having an opening portion is placed between the oxygen-generating electrode and the first separator.

Advantageous Effects of Invention

In a metal-air battery according to an embodiment of the present disclosure, a first separator is interposed between a metal negative electrode and an oxygen-generating electrode and is in direct contact with the metal negative electrode; hence, the fall of a negative electrode active material into an electrolytic solution can be suppressed and the negative electrode active material can remain in the first separator. This provides effects that the uneven deposition of the negative electrode active material on a surface of the negative electrode active material layer and, as a result, the deterioration in cycle characteristics of the battery can be prevented.

DESCRIPTION OF EMBODIMENTS

Embodiment 1

Figure 1:
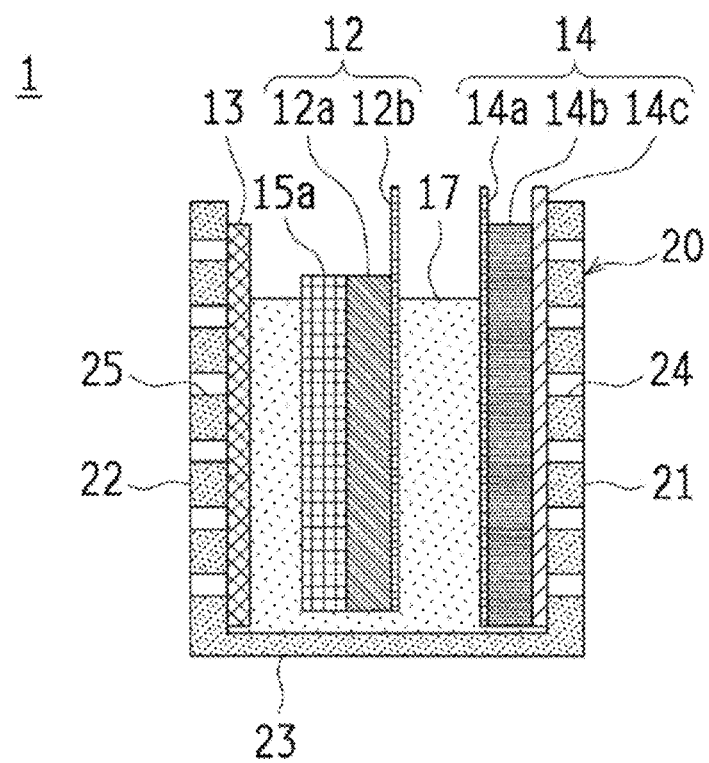
FIG. 1 is a schematic sectional view illustrating an example of the basic configuration of a metal-air battery according to Embodiment 1.

Embodiments of the present disclosure are described below in detail with reference to drawings. FIG. 1 is a schematic sectional view illustrating an example of the basic configuration of a metal-air battery 1 according to Embodiment 1. Incidentally, FIG. 1 is a schematic sectional view in which internal components are shown with a width larger than the actual size thereof so as to be easily visible.

The metal-air battery 1 according to Embodiment 1 exemplifies a three-electrode metal-air secondary battery which is composed of a metal negative electrode 12, an oxygen-generating electrode 13, an air electrode 14, and a first separator 15*a* and in which the metal negative electrode 12, the oxygen-generating electrode 13, the air electrode 14, and the first separator 15*a* are placed in parallel to each other in such a state that at least one portion thereof is immersed in an electrolytic solution 17 in a battery case 20. The metal negative electrode 12 contains metal serving as a negative electrode active material. The oxygen-generating electrode 13 is used as a positive electrode during charge. The air electrode 14 is used as a positive electrode during charge.

That is, in the metal-air battery 1, the metal negative electrode 12, the oxygen-generating electrode 13, the air electrode 14, and the first separator 15a are placed in the battery case 20 in parallel to each other, the oxygen-generating electrode 13 is placed on one side (the left side in FIG. 1) of the metal negative electrode 12, and the air electrode 14 is placed on another side (the right side in FIG. 1) of the metal negative electrode 12. The first separator 15a is interposed between the metal negative electrode 12 and the oxygen-generating electrode 13 and is in direct contact with the metal negative electrode 12.

The metal-air battery 1 can be applied to, for example, zinc-air batteries, lithium-air batteries, sodium-air batteries, calcium-air batteries, magnesium-air batteries, aluminium-air batteries, iron-air batteries, and the like. In particular, the metal-air battery 1 is preferably applicable to a zinc-air battery in which a metal negative electrode is a zinc species. The zinc-air battery need not use, for example, a flammable electrolytic solution (electrolyte) unlike the lithium-air batteries, can use an alkaline electrolytic solution (electrolyte), and therefore is advantageous in that safety is high. Furthermore, the zinc-air battery is advantageous in that an increase in capacity is easy because the negative electrode can be manufactured at lower cost as compared to the lithium-air batteries.

Next, members forming the metal-air battery 1 are described in detail.

(Description of Air Electrode 14)

The air electrode 14 contains a catalyst having oxygen reduction activity and is a porous electrode serving as a positive electrode during the discharge of the metal-air battery 1. In the air electrode 14, when the electrolytic solution 17 used is an alkaline aqueous solution, a discharge reaction in which water supplied from the electrolytic solution 17 or the like, an oxygen gas supplied from air, and electrons react on the catalyst to form hydroxy ions ($OH^-$) occurs. That is, in the air electrode 14, the discharge reaction proceeds at a three-phase interface where oxygen (gas phase), water (liquid phase), and an electron conductor (solid phase) are present together.

The air electrode 14 is placed such that an oxygen gas contained in air can be diffused. The air electrode 14 may be placed such that, for example, at least one portion of a surface of the air electrode 14 is exposed to air. As shown in FIG. 1, in the metal-air battery 1, the battery case 20, which is described below, is provided with air intakes 24 and the oxygen gas contained in air can be diffused in the air electrode 14 through the air intakes 24. Incidentally, water may be supplied to the air electrode 14 through the air intakes 24.

As shown in FIG. 1, the air electrode 14 is composed of an air electrode current collector 14a, a catalyst layer 14b containing the catalyst, and a water-repellent layer 14c.

The catalyst layer 14b may contain, for example, a conductive porous support and the catalyst supported on the porous support. This enables a three-phase interface where an oxygen gas, water, and electrons are present together to be formed on the catalyst, thereby enabling the discharge reaction to proceed. The catalyst contained in the catalyst layer 14b is, for example, a catalyst (oxygen activation catalyst) having oxygen reduction activity. Examples of the oxygen activation catalyst include platinum-group metals such as nickel, palladium, and platinum; perovskite-type oxides containing transition metals such as cobalt, manganese, and iron; oxides of noble metals such as ruthenium and palladium; and manganese oxide.

The air electrode current collector 14a is preferably made of a porous material having electronic conductivity. When the electrolytic solution 17 used is an alkaline aqueous solution, nickel or material obtained by plating the surface of a metal material such as stainless steel with nickel is preferably used from the viewpoint of corrosion resistance. Using mesh, an expanded metal, a punching metal, a sintered product of metal particles or metal fibers, or a foam metal enables the air electrode current collector 14a to be porous. The air electrode current collector 14a is preferably placed opposite to the metal negative electrode 12 with respect to the catalyst layer 14b.

The air electrode current collector 14a may function as a gas diffusion layer. In this case, the air electrode current collector 14a is, for example, carbon paper or cloth surface-treated with a water-repellent resin, or a porous sheet made of carbon black and the water-repellent resin. The water-repellent resin is used to prevent the leakage of the electrolytic solution 17 and has a gas-liquid separation function. That is, the electrolytic solution 17 is prevented from leaking from the battery case 20 and the supply of an oxygen gas to the catalyst layer 14b is not hindered.

The water-repellent layer 14c is made of a porous material containing the water-repellent resin and is placed opposite to the air electrode current collector 14a (that is, opposite to the metal negative electrode 12) with respect to the catalyst layer 14b. The placement of the water-repellent layer 14c enables the leakage of the electrolytic solution 17 through the air electrode 14 to be suppressed. The water-repellent resin is, for example, polytetrafluoroethylene (PTFE).

The air electrode 14 may be electrically connected to an air electrode terminal (not shown). This enables charges generated in the catalyst layer 14b to be extracted to an external circuit, which is not shown.

(Description of Oxygen-Generating Electrode 13)

The oxygen-generating electrode 13 is a porous electrode serving as a positive electrode during charge. In the oxygen-generating electrode 13, when the electrolytic solution 17 used is an alkaline aqueous solution, a reaction in which water, oxygen, and electrons are produced from hydroxy ions (OH–) occurs (charge reaction). That is, in the oxygen-generating electrode 13, a discharge reaction proceeds at a three-phase interface where oxygen (gas phase), water (liquid phase), and an electron conductor (solid phase) are present together.

The oxygen-generating electrode 13 is placed such that an oxygen gas produced with the progress of the charge reaction can be diffused. The oxygen-generating electrode 13 may be placed such that, for example, at least one portion of the oxygen-generating electrode 13 communicates with outside air. As shown in FIG. 1, in the metal-air battery 1, the battery case 20, which is described below, is provided with air outlets 25 and oxygen produced with the progress of the charge reaction is discharged to outside air through the air outlets 25.

The oxygen-generating electrode 13 is preferably made of a porous material having electronic conductivity. When the electrolytic solution 17 used is an alkaline aqueous solution, nickel or material obtained by plating the surface of a metal material such as stainless steel with nickel is preferably used from the viewpoint of corrosion resistance and the viewpoint of the catalysis of the charge reaction. Using mesh, an expanded metal, a punching metal, a sintered product of metal particles or metal fibers, or a foam metal enables the oxygen-generating electrode 13 to be porous. The oxygen-generating electrode 13 may further include catalyst particles, placed on a surface thereof, promoting the charge reaction.

On the other hand, the oxygen-generating electrode 13 may further include an oxygen-generating electrode current collector (not shown). The oxygen-generating electrode current collector is preferably made of a porous material having electronic conductivity.

The oxygen-generating electrode 13 may be electrically connected to an oxygen-generating electrode terminal (not shown). This enables charges necessary for the charge reaction to be supplied to the oxygen-generating electrode 13 from an external circuit, which is not shown.

(Description of Metal Negative Electrode 12)

The metal negative electrode 12 is an electrode containing an active material (negative electrode active material) containing a metal element. In the metal negative electrode 12, an oxidation reaction of the active material and a reduction reaction thereof occur during discharge and charge, respectively. The metal element used is zinc, lithium, sodium, calcium, magnesium, aluminium, iron, or the like. When the metal element is zinc, an oxidation reaction of metallic zinc occurs during discharge. That is, as a result of the oxidation of zinc, zinc is dissolved in the electrolytic solution 17 to form zincate ions in some cases or directly forms zinc oxide or zinc hydroxide in some cases.

On the other hand, a reduction reaction to metallic zinc occurs during charge. That is, zinc is produced by the reduction of the zincate ions dissolved in the electrolytic solution 17 in some cases or zinc oxide or zinc hydroxide is directly reduced to zinc in some cases.

As described above, a reaction involving hydroxy ions ($OH^-$) in addition to the active material occurs together with the discharge reaction and the charge reaction. Therefore, the metal negative electrode 12 must have a structure in which the electrolytic solution 17 is in efficient contact with the metal negative electrode 12 so as to serve as a conduction path for the active material and the hydroxy ions ($OH^-$). When the metal negative electrode 12 is, for example, a porous electrode made of particles of the active material, the electrolytic solution 17 enters gaps between the active material particles; hence, contact interfaces between the active material particles and the electrolytic solution 17 can be extended. The metal negative electrode 12 may further contain a binder. When the metal negative electrode 12 contains the binder, the active material particles can be bound together.

The active material may be metal in a reduced state, metal in an oxidized state, or a mixture of metal in a reduced state and metal in an oxidized state. When the metal element, which is contained in the active material, is zinc, the metal element in a reduced state is metallic zinc and the metal element in an oxidized state is zinc oxide. An oxidation or reduction reaction proceeds from the surface of the active material. Therefore, when the active material contains zinc, which is the metal element, the active material may be in such a state that the amount of zinc oxide at the surface is large and the amount of metallic zinc in the bulk is large or, in contrast, in such a state that the amount of metallic zinc at the surface is large and the amount of zinc oxide in the bulk is large. When the metal negative electrode 12 contains zinc, zinc oxide can be reduced to zinc in such a manner that the metal negative electrode 12 is taken out of the battery case 20 after discharge.

As shown in FIG. 1, the metal negative electrode 12 may be configured to include a negative electrode active material layer 12a containing the active material and a negative electrode current collector 12b. The negative electrode current collector 12b is preferably made of a porous material having electronic conductivity. From the viewpoint of suppressing self-corrosion, material with high hydrogen overvoltage or material obtained by plating the surface of a metal material such as stainless steel with the material with high hydrogen overvoltage is preferably used. Using mesh, an expanded metal, a punching metal, a sintered product of metal particles or metal fibers, or a foam metal enables the negative electrode current collector 12b to be porous. As shown in FIG. 1, the negative electrode current collector 12b is placed opposite to the first separator 15a with respect to the negative electrode current collector 12b. The placement position of the negative electrode current collector 12b is not particularly limited unless the negative electrode current collector 12b is placed at the interface between the negative electrode active material layer 12a and the first separator 15a. That is, the negative electrode active material layer 12a may face at least the oxygen-generating electrode 13. The metal negative electrode active material layer 12a preferably has at least one surface facing the oxygen-generating electrode 13. The surface of the negative electrode active material layer 12a that faces the oxygen-generating electrode 13 may be irregular.

The metal negative electrode 12 may be electrically connected to a metal negative electrode terminal (not shown). This enables charges consumed/generated in the metal negative electrode 12 to be transferred to an external circuit, which is not shown.

(Description of First Separator 15a)

Separators (including the first separator 15a) for use in metal-air batteries are generally those preventing electrodes from being short-circuited by an electronic conduction path formed between the electrodes and are formed from an electronically insulating material. It is suppressed that, for example, metal dendrites reductively deposited on the metal negative electrode 12 during charge reach the oxygen-generating electrode 13 to cause short-circuiting.

The first separator 15a used is a porous resin sheet or a solid electrolyte sheet such as an ion-exchange membrane. In the case where the first separator 15a is placed between electrodes, if ion conduction is hindered by the first separator 15a, a battery charge reaction and discharge reaction cannot occur. However, using the above material allows ion conduction to occur through the first separator 15a placed between the electrodes.

(Description of Electrolytic Solution 17)

The electrolytic solution 17 is a liquid in which an electrolyte is dissolved in a solvent and which has ionic conductivity. The type of the electrolytic solution 17 varies depending on the type of the active material, which is contained in the metal electrode 12, and may be an electrolytic solution (aqueous electrolytic solution) containing a water solvent.

In the case of, for example, a zinc-air battery, an aluminium-air battery, or an iron-air battery, the electrolytic solution 17 used may be an alkaline aqueous solution such as an aqueous solution of sodium hydroxide or an aqueous solution of potassium hydroxide. In the case of a magnesium-air battery, the electrolytic solution 17 used may be an aqueous solution of sodium chloride. In the case of a lithium-air battery, the electrolytic solution 17 used may be organic.

The electrolytic solution 17 may contain an organic additive or an inorganic additive in addition to an electrolyte or may be gelatinized with a polymer additive.

(Description of Battery Case 20)

The battery case 20 is a housing containing the metal negative electrode 12, oxygen-generating electrode 13, air electrode 14 immersed in the electrolytic solution 17 and is cuboid-shaped so as to have an inner portion which is empty. That is, a first main wall 21 and second main wall 22 which are rectangle-shaped are placed opposite to each other and three sides, that is, a left edge portion, right edge portion, and lower edge portion of each of the first main wall 21 and the second main wall 22 are connected to a side wall 23 to form such a shape that an upper edge side is open. The battery case 20, which is shaped as described above, is shaped such that the size in a thickness direction (a width direction of the side wall 23) Y is less than that in a width direction X and a height direction Z. In particular, the sizes of the battery case 20 are, for example, 200 mm in the width direction X (width), for example, 20.84 mm in the thickness direction Y (depth), and, for example, 135 mm in the height direction Z (height).

The first main wall 21 is provided with the air intakes (a plurality of holes) 24 such that the inside is open. The second main wall 22 is provided with the air outlets (a plurality of holes) 25 such that the inside is open. That is, the battery case 20 is configured to take in air through the air intakes 24 and to discharge air outside through the air outlets 25.

An upper edge portion of the battery case 20 serves as an electrolytic solution slot, through which the electrolytic solution 17 can be refilled in the battery case 20. The battery case 20 is provided with a detachable lid portion (not shown) covering the electrolytic solution slot.

Material making up the battery case 20 and the lid portion is not particularly limited and may have corrosion resistance to the electrolytic solution 17. Examples of the material include polyvinyl chloride (PVC), polyvinyl acetate, an ABS resin, polyvinylidene fluoride, polyacetal, polyethylene, polypropylene, polyisobutylene, a fluorocarbon resin, and an epoxy resin.

Up to this point, the descriptions of the air electrode 14, he oxygen-generating electrode 13, the metal negative electrode 12, the first separator 15a, and the battery case 20 are completed.

The metal-air battery 1 according to Embodiment 1 has a characteristic configuration in which the first separator 15a is interposed between the metal negative electrode 12 and the oxygen-generating electrode 13 and the first separator 15a is in direct contact with the metal negative electrode 12. That is, the first separator 15a covers the negative electrode active material layer 12a of the metal negative electrode 12, thereby enabling the fall of the negative electrode active material into the electrolytic solution 17 to be suppressed and the negative electrode active material to remain in the first separator 15a. This enables the uneven deposition of the negative electrode active material on a surface of the negative electrode active material layer 12a to be suppressed. Suppressing the uneven deposition of the negative electrode active material enables the deterioration in cycle characteristics of the battery to be prevented.

Embodiment 2

Figure 2:
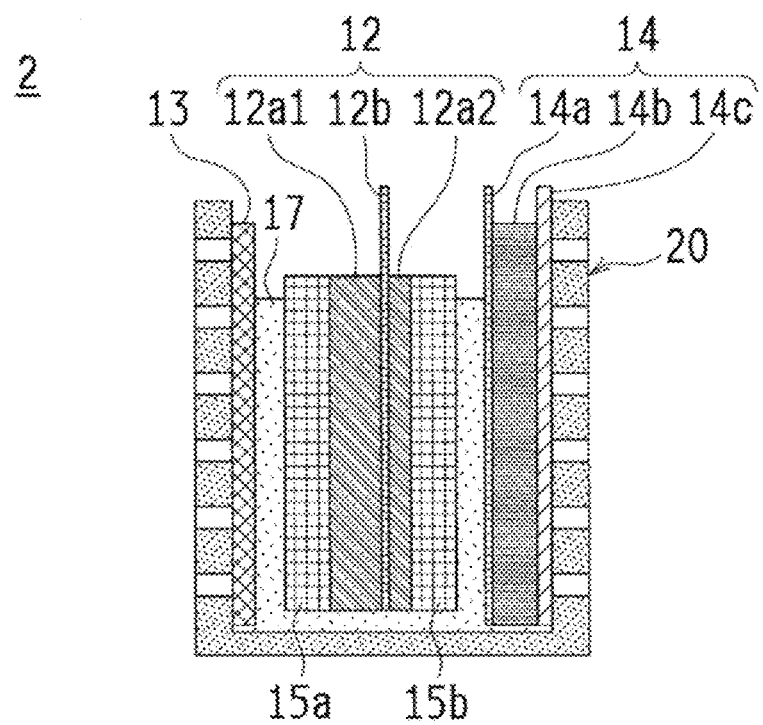
FIG. 2 is a schematic sectional view illustrating an example of the basic configuration of a metal-air battery according to Embodiment 2.

FIG. 2 is a schematic sectional view illustrating an example of the basic configuration of a metal-air battery 2 according to Embodiment 2. The metal-air battery 2 is similar in configuration to the metal-air battery 1 according to Embodiment 1 and therefore different portions only are described herein. Members having the same configuration and function are given the same reference signs as those used in Embodiment 1 and will not be described in detail.

As shown in FIG. 2, in the metal-air battery 2, a negative electrode current collector 12b is placed in a negative electrode active material layer 12a. That is, the negative electrode active material layer 12a includes a first negative electrode active material portion 12a1 placed closer to the oxygen-generating electrode 13 than the negative electrode current collector 12b and a second negative electrode active material portion 12a2 placed closer to the air electrode 14. The thickness of the first negative electrode active material portion 12a1 is larger than the thickness of the second negative electrode active material portion 12a2. The ratio of the thickness of the first negative electrode active material portion 12a1 to the thickness of the second negative electrode active material portion 12a2 is preferably within the range of 1:1 to 120:1 and more preferably 3:1 to 120:1. When the ratio of the thickness of the first negative electrode active material portion 12a1 to the thickness of the second negative electrode active material portion 12a2 exceeds 120:1, the first negative electrode active material portion 12a1 polarizes and the electromotive force of the metal-air battery 2 decreases in some cases. The thickness of each of the first negative electrode active material portion 12a1 and the second negative electrode active material portion 12a2 can be measured with, for example, a thickness gage such as a micrometer or a rotary caliper.

In general, in metal-air batteries, there is a problem in that the reduction of metal (zinc or the like) in a surface of a negative electrode active material facing the oxygen-generating electrode during charge grows dendrites (needle-like metal deposits) to cause a short circuit between a negative electrode and an oxygen-generating electrode. In this regard, it has become clear that the reduction of metal occurs gradually from the vicinity of a current collector. Therefore, in the metal-air battery 2, the position of the negative electrode current collector 12b is displaced from the center of the negative electrode active material layer 12a to the air electrode 14, so that the distance from the negative electrode current collector 12b to a surface of the first negative electrode active material portion 12a1 (a surface of a metal negative electrode 12 that faces the oxygen-generating electrode) is long. This enables the growth of dendrites on the first negative electrode active material portion 12a1 surface to be suppressed. As a result, the metal-air battery 2 can be charged at a deeper depth as compared to metal-air batteries in which a negative electrode current collector is placed at the center of a negative electrode active material layer 12, even with the same amount of a negative electrode active material.

Incidentally, in the case where a surface of the negative electrode current collector 12b facing the air electrode is exposed, dendrites may possibly be deposited on a surface of the negative electrode current collector 12b during charge to cause a short circuit between the metal negative electrode 12 and the air electrode 14. Therefore, as shown in FIG. 2, the second negative electrode active material portion 12a2 is preferably present. Furthermore, when the second negative electrode active material portion 12a2 is present, a surface of the second negative electrode active material portion 12a2 is preferably covered by a separator. Therefore, as shown in FIG. 2, the metal-air battery 2 includes a second separator 15b covering the second negative electrode active material portion 12a2 (in direct contact with the second negative electrode active material portion 12a2) in addition to a first separator 15a. Incidentally, the first separator 15a and the second separator 15b may be made of the same material or different materials.

Embodiment 3

Figure 3:
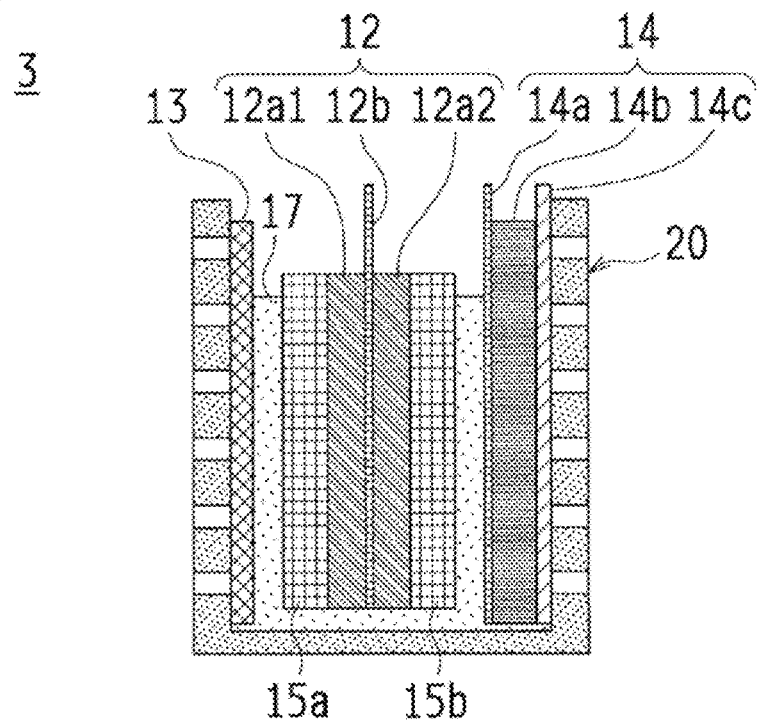
FIG. 3 is a schematic sectional view illustrating an example of the basic configuration of a metal-air battery according to Embodiment 3.

FIG. 3 is a schematic sectional view illustrating an example of the basic configuration of a metal-air battery 3 according to Embodiment 3. The metal-air battery 3 is similar in configuration to the metal-air batteries 1 and 2 according to Embodiments 1 and 2 and therefore different portions only are described herein. Members having the same configuration and function are given the same reference signs as those used in Embodiments 1 and 2 and will not be described in detail.

As shown in FIG. 3, in the metal-air battery 3, a negative electrode current collector 12b is placed in a negative electrode active material layer 12a. That is, the negative electrode active material layer 12a includes a first negative electrode active material portion 12a1 placed closer to the oxygen-generating electrode 13 than the negative electrode current collector 12b and a second negative electrode active material portion 12a2 placed closer to the air electrode 14. The average porosity of the second negative electrode active material portion 12a2 is larger than the average porosity of the first negative electrode active material portion 12a1. The average porosity of the first negative electrode active material portion 12a1 is preferably within the range of 5% to 60% and more preferably 5% to 55%. The average porosity of the second negative electrode active material portion 12a2 is preferably within the range of 60% to 95% and more preferably 65% to 95%.

In the metal-air battery 3, the second negative electrode active material portion 12a2, which is placed closer to the air electrode 14, is farther in distance from an oxygen-generating electrode 13 as compared to the first negative electrode active material portion 12a1. Therefore, the amount of an active material reduced in the second negative electrode active material portion 12a2 during charge is small and the second negative electrode active material portion 12a2 is likely to be deactivated during discharge.

In the metal-air battery 3, increasing the average porosity of the second negative electrode active material portion 12a2 enables the ion conduction resistance between an air electrode 14 and a negative electrode current collector 12b to be reduced, thereby enabling the discharge voltage to be increased.

The "average porosity" can be determined in such a manner that the pore volume in a negative electrode active material portion is measured with a general mercury porosimeter, is divided by the apparent volume of the negative electrode active material portion, and is multiplied by 100. For the pore volume, in the case of using, for example, a mercury porosimeter, "Autopore IV 9500", manufactured by Shimadzu Corporation, the pore volume of gaps corresponding to a pore size within the range of 500 μm to 0.0055 μm can be measured by performing measurement in a pressure range from 0.01 psi to 33,000 psi. The apparent volume of the negative electrode active material portion can be calculated as the product of the area and thickness of the negative electrode active material in plan view. In particular, for example, a measurement sample is cut out of the negative electrode active material portion, which is a measurement object, with a punching machine, a cutter, or the like. Next, the area and thickness of the negative electrode active material portion of the measurement sample in plan view are measured and the measurements are multiplied, whereby apparent volume of the negative electrode active material portion is calculated.

Embodiment 4

Figure 4:
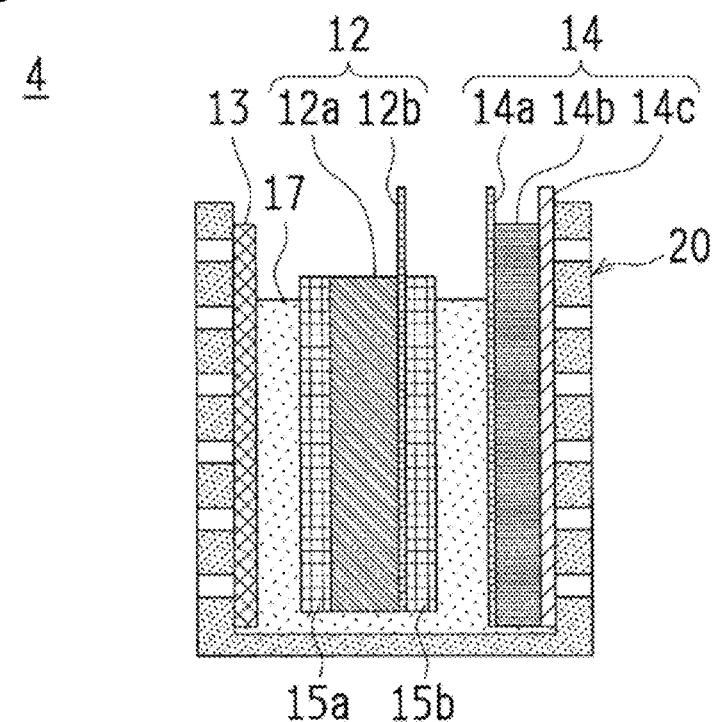
FIG. 4 is a schematic sectional view illustrating an example of the basic configuration of a metal-air battery according to Embodiment 4.

FIG. 4 is a schematic sectional view illustrating an example of the basic configuration of a metal-air battery 4 according to Embodiment 4. The metal-air battery 4 is similar in configuration to the metal-air batteries 1 to 3 according to Embodiments 1 to 3 and therefore different portions only are described herein. Members having the same configuration and function are given the same reference signs as those used in Embodiments 1 to 3 and will not be described in detail.

As shown in FIG. 4, in the metal-air battery 4, a negative electrode active material layer 12a is composed of only a first negative electrode active material portion 12a1 placed closer to the oxygen-generating electrode 13 and a second separator 15b which is a porous body (preferably a porous membrane made of resin) is placed closer to the air electrode 14 than a negative electrode current collector 12b. The second separator 15b is preferably placed so as to cover a surface of the negative electrode current collector 12b (in direct contact with the negative electrode current collector 12b). In the metal-air battery 4, a first separator 15a is preferably an anion-exchange membrane. The anion-exchange membrane suppresses the penetration of ions of selected metal species into a negative electrode active material. Therefore, the metal-air battery 4 according to Embodiment 4 can suppress the deposition of dendrites of the negative electrode active material during charge to prevent short circuiting between an oxygen-generating electrode and a negative electrode.

In Embodiments 2 and 3, the second negative electrode active material portion 12a2 is placed closer to the air electrode 14 than the negative electrode current collector 12b. The second negative electrode active material portion 12a2 is farther in distance from the oxygen-generating electrode 13 as compared to the first negative electrode active material portion 12a1. Therefore, the amount of the active material reduced in the second negative electrode active material portion 12a2 during charge is small and the second negative electrode active material portion 12a2 is likely to be deactivated during discharge.

Thus, in the metal-air battery 4 according to Embodiment 4, the second separator 15b only is placed on the negative electrode current collector 12b facing the air electrode 14 without placing the second negative electrode active material portion 12a2 and the second separator 15b is porous. This enables the ion conduction resistance between the air electrode 14 and the negative electrode current collector 12b to be reduced and therefore allows the discharge voltage of the metal-air battery 4 to be high.

Embodiment 5

Figure 5:
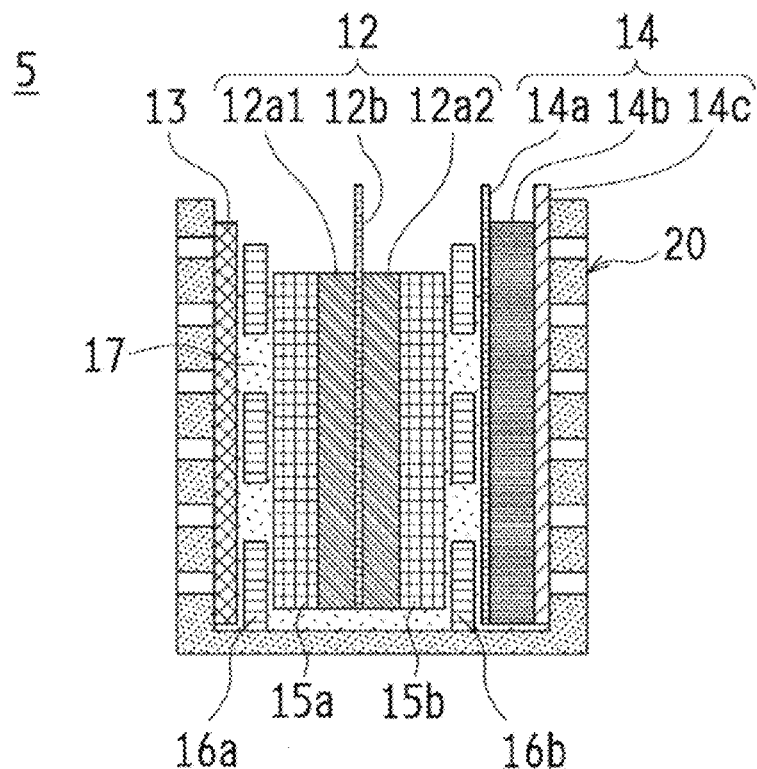
FIG. 5 is a schematic sectional view illustrating an example of the basic configuration of a metal-air battery according to Embodiment 5.

FIG. 5 is a schematic sectional view illustrating an example of the basic configuration of a metal-air battery 5 according to Embodiment 5. The metal-air battery 5 is similar in configuration to the metal-air batteries 1 to 4 according to Embodiments 1 to 4 and therefore different portions only are described herein. Members having the same configuration and function are given the same reference signs as those used in Embodiments 1 to 4 and will not be described in detail.

As shown in FIG. 5, in the metal-air battery 5, a first insulator 16a is placed closer to the oxygen-generating electrode 13 with than a metal negative electrode 12. In particular, the first insulator 16a is placed between a first separator 15a and an oxygen-generating electrode 13. Furthermore, a second insulator 16b is placed closer to the air electrode 14 than the metal negative electrode 12.

A configuration shown in FIG. 5 exemplifies the metal-air battery 5 in such a case that a second negative electrode active material portion 12a2 is placed in the metal negative electrode 12 and the metal-air battery 5 includes a second separator 15b. The second insulator 16b is placed between the second separator 15b and the oxygen-generating electrode 13. However, the present disclosure is not limited to this. In Embodiment 5, the second negative electrode active material portion 12a2 and the second separator 15b may be omitted. Therefore, the second insulator 16b is placed between the second negative electrode active material portion 12a2 and the oxygen-generating electrode 13 or between a negative electrode current collector 12b and the oxygen-generating electrode 13 in some cases depending on the presence or absence of the second negative electrode active material portion 12a2 and the second separator 15b.

Both the first insulator 16a and the second insulator 16b are provided with one or more opening portions. The aperture ratio of the second insulator 16b is larger than the aperture ratio of the first insulator 16a. The "aperture ratio" of the first insulator 16a is calculated in such a manner that the sum of the areas of the opening portions in an plane direction of a surface of the first insulator 16a that is provided with the opening portions is divided by the area of the plane direction of the first insulator 16a that includes the opening portions and is multiplied by 100. The "aperture ratio" of the second insulator 16b is calculated in such a manner that the sum of the areas of the opening portions in an plane direction of a surface of the first insulator 16a that is provided with the opening portions is divided by the area of the plane of the first insulator 16a that includes the opening portions and is multiplied by 100.

Current crowding occurs at an edge portion of the metal negative electrode 12 during charge. As a result, dendrites may possibly grow to cause a short circuit between the metal negative electrode 12 and the oxygen-generating electrode 13. The metal-air battery 5 includes the first insulator 16a; hence, current crowding at the edge portion of the metal negative electrode 12 during charge can be suppressed and short circuiting can be prevented.

Since the second insulator 16b is larger in aperture ratio than the first insulator 16a, the exposed area of the metal negative electrode 12 facing the air electrode 14 can be increased and current crowding can be reversely caused at the edge during discharge. Therefore, dendrites grown on the edge portion during charge can be efficiently consumed and short circuiting can be suppressed.

Embodiment 6

Figure 6:
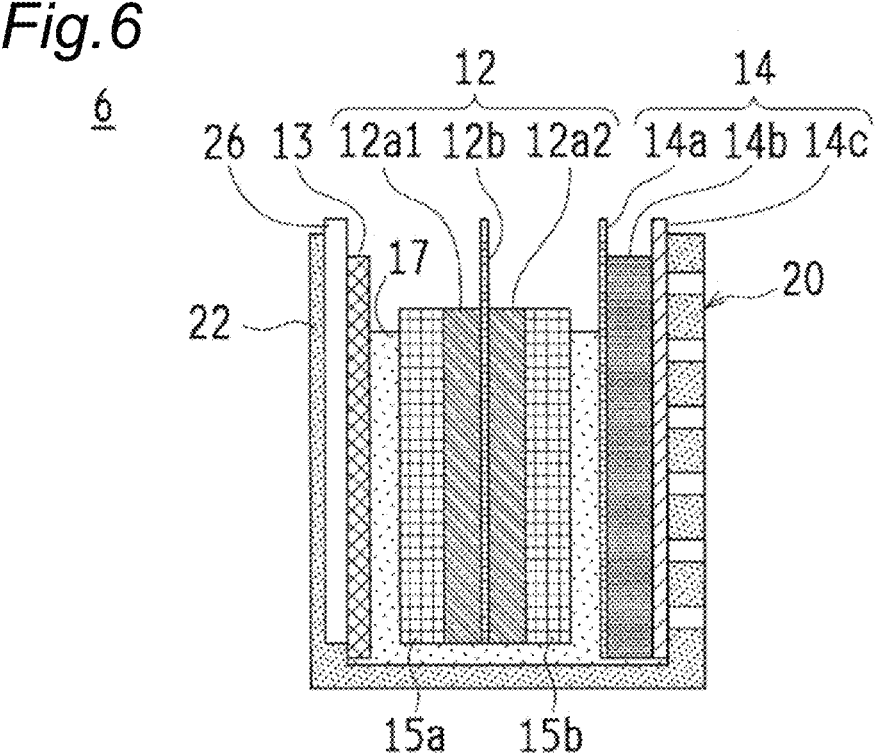
FIG. 6 is a schematic sectional view illustrating an example of the basic configuration of a metal-air battery according to Embodiment 6.

FIG. 6 is a schematic sectional view illustrating an example of the basic configuration of a metal-air battery 6 according to Embodiment 6. The metal-air battery 6 is similar in configuration to the metal-air batteries 1 to 5 according to Embodiments 1 to 5 and therefore different portions only are described herein. Members having the same configuration and function are given the same reference signs as those used in Embodiments 1 to 5 and will not be described in detail.

Figure 7:
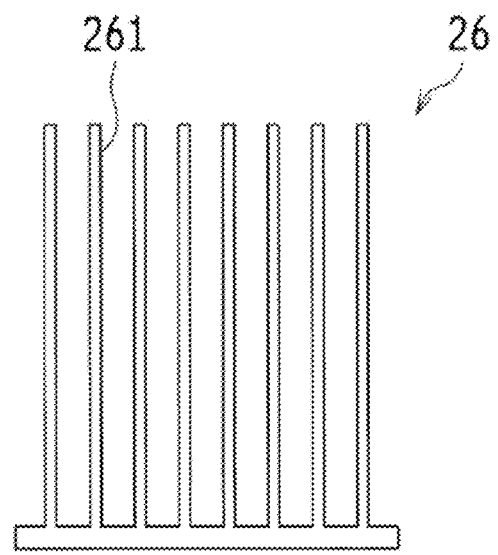
FIG. 7 is a plan view of an exhaust passage member used in the metal-air battery shown in FIG. 6.

As shown in FIG. 6, the metal-air battery 6 includes an exhaust passage discharging gas generated in the vicinity of an oxygen-generating electrode 13 in a battery housing located on the oxygen-generating electrode 13 from an upper portion of the housing. In particular, an exhaust passage member 26 is placed between the oxygen-generating electrode 13 and a second main wall 22 of a battery case 20. FIG. 7 is an illustration of the exhaust passage member 26 viewed from the second main wall 22 of the battery case 20 (from the left side of FIG. 6). The exhaust passage member 26 is a comb-shaped member as shown in FIG. 7 and gaps between neighboring comb teeth 261·261 act as exhaust passages. Alternatively, a groove portion may be directly formed on the inner surface side of the second main wall 22 of the battery case 20 such that the groove portion acts as an exhaust passage.

Since the metal-air battery 6 includes the exhaust passage, the upward discharge of an oxygen gas generated from the oxygen-generating electrode 13 during charge can be facilitated. This suppresses current crowding in a plane, thereby enabling short circuiting due to the growth of dendrites to be suppressed. Incidentally, in the configuration of the metal-air battery 6, openings (the air outlets 25 shown in FIG. 1) for discharging gas need not be placed in the second main wall 22 of the battery case 20.

Embodiment 7

Figure 8:
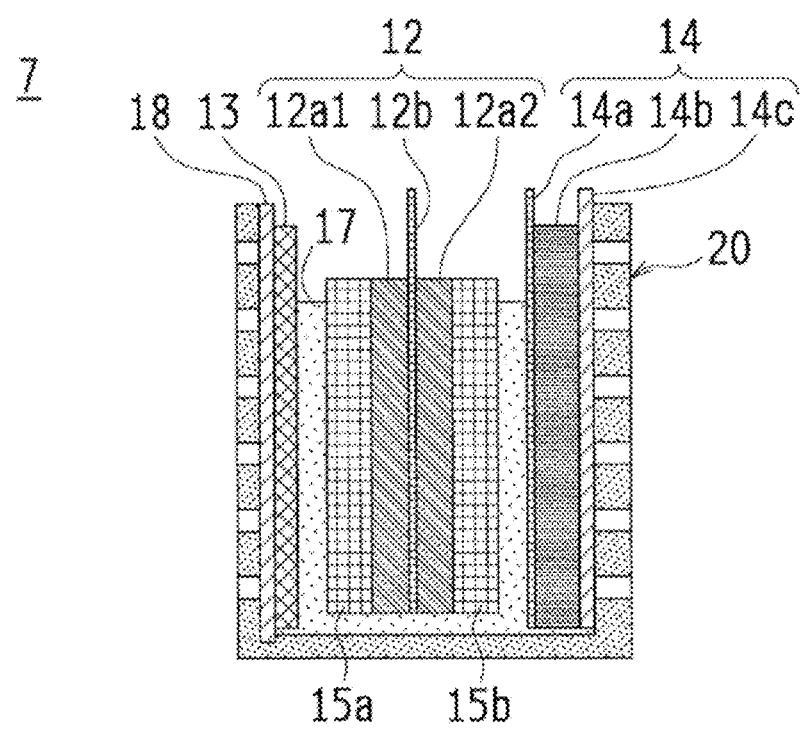
FIG. 8 is a schematic sectional view illustrating an example of the basic configuration of a metal-air battery according to Embodiment 7.

FIG. 8 is a schematic sectional view illustrating an example of the basic configuration of a metal-air battery 7 according to Embodiment 7. The metal-air battery 7 is similar in configuration to the metal-air batteries 1 to 6 according to Embodiments 1 to 6 and therefore different portions only are described herein. Members having the same configuration and function are given the same reference signs as those used in Embodiments 1 to 6 and will not be described in detail.

As shown in FIG. 8, the metal-air battery 7 includes a water-repellent film 18 placed on the opposite side of an oxygen-generating electrode 13 to a metal negative electrode 12. Since the metal-air battery 7 includes the water-repellent film 18, oxygen can be efficiently discharged from a surface of the oxygen-generating electrode 13 that is opposite to the metal negative electrode 12 during charge. This suppresses current crowding in a plane, thereby enabling short circuiting due to the growth of dendrites to be suppressed. Incidentally, the water-repellent film 18 and a water-repellent layer 14c of an air electrode 14 may be made of the same material or different materials.

Embodiment 8

Figure 9:
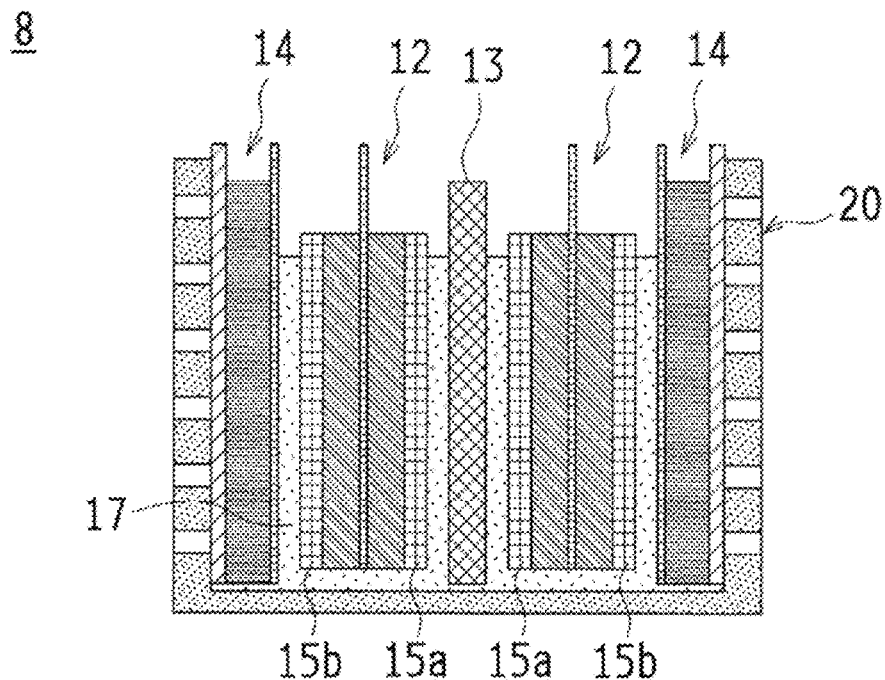
FIG. 9 is a schematic sectional view illustrating an example of the basic configuration of a metal-air battery according to Embodiment 8.

FIG. 9 is a schematic sectional view illustrating an example of the basic configuration of a metal-air battery 8 according to Embodiment 8. The metal-air battery 8 is similar in configuration to the metal-air batteries 1 to 7 according to Embodiments 1 to 7 and therefore different portions only are described herein. Members having the same configuration and function are given the same reference signs as those used in Embodiments 1 to 7 and will not be described in detail.

As shown in FIG. 9, the metal-air battery 8 has a configuration in which an oxygen-generating electrode 13 is centered and metal negative electrodes 12 are placed on both sides thereof. Furthermore, each of air electrodes 14 is placed outside a corresponding one of the metal negative electrodes 12. That is, the metal-air battery 8 has a symmetrical structure with the oxygen-generating electrode 13 centered.

The metal-air battery 8 has a configuration in which the single oxygen-generating electrode 13 can be used with the two metal negative electrodes 12, that is, a configuration having two pairs of charge sections composed of the oxygen-generating electrode 13 and the metal negative electrodes 12; hence, high energy density can be achieved.

Embodiment 9

Figure 10:
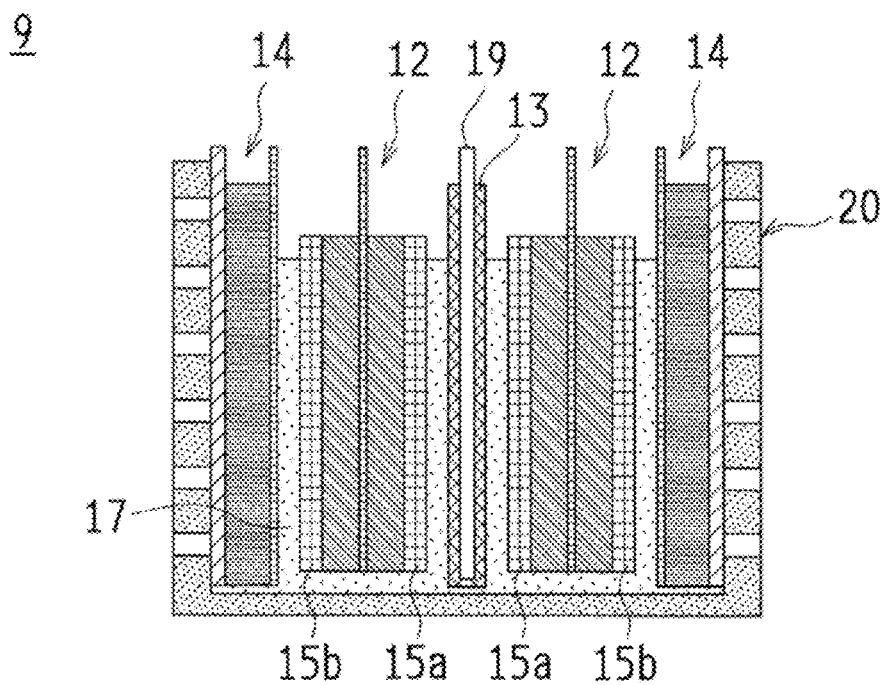
FIG. 10 is a schematic sectional view illustrating an example of the basic configuration of a metal-air battery according to Embodiment 9.

FIG. 10 is a schematic sectional view illustrating an example of the basic configuration of a metal-air battery 9 according to Embodiment 9. The metal-air battery 9 is similar in configuration to the metal-air batteries 1 to 8 according to Embodiments 1 to 8 and therefore different portions only are described herein. Members having the same configuration and function are given the same reference signs as those used in Embodiments 1 to 8 and will not be described in detail.

As shown in FIG. 10, the metal-air battery 9, as well as the metal-air battery 8 shown in FIG. 9, has a configuration in which an oxygen-generating electrode 13 is centered and which has two pairs of charge sections composed of the oxygen-generating electrode 13 and metal negative electrodes 12. The metal-air battery 9 is configured such that the oxygen-generating electrode 13 includes an exhaust passage member 19 for discharging gas generated in the vicinity of an oxygen-generating electrode 13 from an upper portion of a housing. In particular, the exhaust passage member 19 is placed in the oxygen-generating electrode 13, thereby allowing the oxygen-generating electrode 13 to include an exhaust passage. The exhaust passage member 19 may have substantially the same shape as that of the exhaust passage member 26 (Embodiment 6) shown in FIG. 7.

The metal-air battery 9 has features of both of Embodiments 6 and 8. In the metal-air battery 9, the exhaust passage member 19 is placed; hence, the oxygen-generating electrode 13 need not have a thickness sufficient to discharge the gas generated in the vicinity of the oxygen-generating electrode 13 and the thickness of the oxygen-generating electrode 13 may be small. Therefore, the metal-air battery 9 can be adjusted such that the width of a battery housing in a thickness direction of a negative electrode is less than that of the metal-air battery 8 according to Embodiment 8.

The present disclosure is not limited to the above-mentioned embodiments. Various modifications can be made within the scope specified in the claims. Embodiments obtained by appropriately combining technical means disclosed in different embodiments are included in the technical scope of the present disclosure.

This international application claims priority to Japanese Patent Application No. 2017-018338 filed on Feb. 3, 2017. The entire contents of Japanese Patent Application No. 2017-018338 are incorporated by reference in this international application.

REFERENCE SIGNS LIST 1 to 9 Metal-air battery
12 Metal negative electrode(s)
12a Negative electrode active material layer
12a1 First negative electrode active material portion
12a2 Second negative electrode active material portion
12b Negative electrode current collector
13 Oxygen-generating electrode
14 Air electrode
14a Air electrode current collector
14b Catalyst layer
14c Water-repellent layer
15a First separator
15b Second separator
16a First insulator
16b Second insulator
17 Electrolytic solution
18 Water-repellent film
19, 26 Exhaust passage member
20 Battery case

The invention claimed is:

1. A metal-air battery comprising:
a metal negative electrode;
an oxygen-generating electrode placed on a surface of the metal negative electrode;
an air electrode placed on another surface of the metal negative electrode;
a negative electrode active material layer included in the metal negative electrode and facing the oxygen-generating electrode; and
a first separator which is placed between the negative electrode active material layer and the oxygen-generating electrode, and which is placed in direct contact with the negative electrode active material layer,
wherein the metal negative electrode further includes a negative electrode current collector,
the negative electrode active material layer includes
a first negative electrode active material portion placed closer to the oxygen-generating electrode than the negative electrode current collector, and
a second negative electrode active material portion placed closer to the air electrode than the negative electrode current collector, and
a thickness of the first negative electrode active material portion is larger than a thickness of the second negative electrode active material portion.

2. The metal-air battery according to claim 1,
an average porosity of the second negative electrode active material portion is larger than an average porosity of the first negative electrode active material portion.

3. The metal-air battery according to claim 1, further comprising:
a second separator which is placed between the metal negative electrode and the air electrode, and which is placed in direct contact with a surface of the metal negative electrode that is located on the air electrode side;
wherein the first separator is an anion-exchange membrane and the second separator is a porous membrane made of resin.

4. The metal-air battery according to claim 1,
wherein two metal negative electrodes are respectively placed on both sides of the oxygen-generating electrode and two air electrodes are respectively placed external to the two metal negative electrodes.

5. The metal-air battery according to claim 1,
wherein a ratio of the thickness of the first negative electrode active material portion to the thickness of the second negative electrode active material portion is 3:1 to 120:1.

6. The metal-air battery according to claim 1,
an average porosity of the first negative electrode active material portion is within a range of 5% to 55%, and an average porosity of the second negative electrode active material portion is within a range of 65% to 95%.

7. The metal-air battery according to claim 1, the negative electrode current collector is placed between the negative electrode active material layer and the air electrode,
the negative electrode current collector is in direct contact with the negative electrode active material layer,
the metal-air battery further includes a second separator which is placed between the metal negative electrode and the air electrode, and
the second separator is placed in direct contact with the negative electrode current collector of the metal negative electrode.

8. The metal-air battery according to claim 1, the metal-air battery further includes a second separator which is placed between the metal negative electrode and the air electrode, and
the second separator is placed in contact with the second negative electrode active material portion.

9. The metal-air battery according to claim 1, wherein a first insulator having an opening portion is placed between the oxygen-generating electrode and the first separator.

\* \* \* \* \*